United States Patent
Miki et al.

[11] Patent Number: 5,923,912
[45] Date of Patent: Jul. 13, 1999

[54] PERFORATION DETECTION DEVICE AND CAMERA PROVIDED WITH THE PERFORATION DETECTION DEVICE

[75] Inventors: Nobuya Miki, Moriguchi; Masaaki Chikasaki, Toyonaka, both of Japan; Shih-Yuan Chen, Taichung County, Taiwan; Ming-Chien Chen; Chi-Jung Tso, both of Taichung, Taiwan

[73] Assignee: Minolta Co., Ltd, Osaka, Japan

[21] Appl. No.: 08/842,359

[22] Filed: Apr. 24, 1997

[30] Foreign Application Priority Data

Apr. 26, 1996 [JP] Japan .................................... 8-106859

[51] Int. Cl.⁶ ...................................................... G03B 1/00
[52] U.S. Cl. .......................... 396/395; 396/397; 396/403; 396/411
[58] Field of Search ..................................... 396/395, 397, 396/398, 399, 400, 403, 404, 411, 440, 392

[56] References Cited

U.S. PATENT DOCUMENTS 4,417,793  11/1983  Oyokota et al. ........................ 396/208
5,603,069   2/1997  Stiehler ................................... 396/397
5,659,831   8/1997  Omi ........................................ 396/395

FOREIGN PATENT DOCUMENTS 8-62713  3/1996  Japan .

*Primary Examiner*—Eddie C. Lee
*Attorney, Agent, or Firm*—Burns, Doane, Swecker & Mathis, LLP

[57] ABSTRACT

A perforation detection device of a contact piece type to be built into a camera. A detection section of a first contact piece arranged on the rear surface side of a path in which the perforations of a film advance in a film feeding stage is constructed of a metal ball which is a separate member from that of the first contact piece. This metal ball comes in pressure contact with a second contact piece arranged on the front surface side of the film as the perforations pass. When the metal ball faces a perforation of the film, this metal ball comes in contact with both the first and the second contact pieces to provide a continuity between the first and second contact pieces, so that the position of the perforation is detected. In the film feeding stage, the metal ball comes in rolling contact with the film surface. The contact pieces have a very small resistance to the film feed, and it is scarcely possible that the film will be injured.

31 Claims, 12 Drawing Sheets

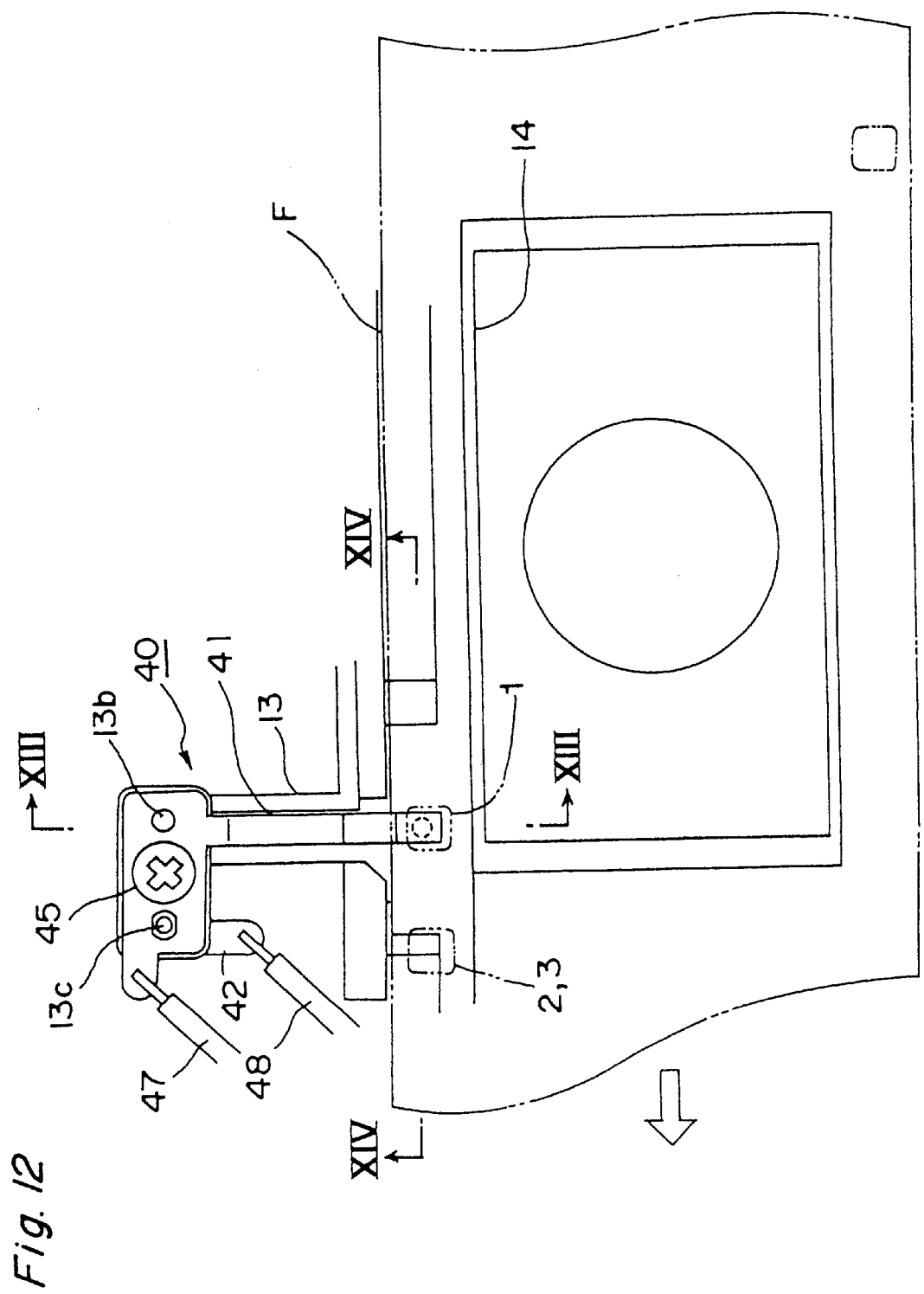

PERFORATION DETECTION DEVICE AND CAMERA PROVIDED WITH THE PERFORATION DETECTION DEVICE

BACKGROUND OF THE INVENTION

The present invention relates in general to an apparatus such as a camera and an image reading apparatus in which is used a film provided with perforations, and in particular, to a perforation detection device provided for them. The present invention relates more particularly to a device for detecting perforations of a film by an intermittent contact of two contact pieces that are arranged at the front and the rear of a path in which the perforations of the film advance.

Conventionally, as a perforation detection device for a camera, there have been adopted a sprocket type, a photo-interrupter type, a contact piece type and so forth. The perforation detection device of the sprocket type is to control film feed by detecting the number of perforations that have passed from the amount of rotation of a sprocket that is meshed with a number of perforations formed continuously at short pitches along a longer side edge of a 35-mm film. The photo-interrupter type is to detect the passage of the perforations by means of a photo-interrupter (or an optical sensor similar to it) arranged on the path in which the perforations advance. The contact piece type is to detect the perforations of a film by an intermittent contact of two contact pieces that are arranged in a path in which the perforations of the film advance and put in pressure contact with each other with interposition of the film as the perforations pass in a film feeding stage. In this case, one of the contact pieces has its tip end portion bent in a convex form so that it comes in contact with the other contact piece through a perforation, constituting a detection section.

Among the aforementioned types, the sprocket type can easily control one-frame feed of the film based on the amount of rotation of the sprocket since the sprocket continuously rotates while being meshed with the perforations in the case of the 35-mm film in which a number of perforations are formed at short pitches along the longer side edge of the film. However, in the case of a new-standard film in which two perforations are formed per frame and which has started to be used lately, it can be considered that the sprocket construction and the mechanism control will be complicated because the perforation interval is not uniform. The photo-interrupter type has the disadvantage that the cost of the photo-interrupter itself is expensive as compared with the other types and a supplementary construction such as a control circuit therefor costs much.

In contrast to this, the contact piece type has the advantage that it is relatively inexpensive and it has an excellent adaptivity to different film standards because it can relatively easily cope with a change of the perforation interval. However, the film advances while in particular the detection section of the contact piece is put in pressure contact with the film surface. Therefore, it is possible that the contact pieces will be a resistance to the film feed or injure the film.

In view of the above, it can be considered that the perforation detection device of the contact piece type can be provided as a relatively low-cost detection device in a camera regardless of the film standard if the possibility that the contact pieces will be a resistance to the film feed or injure the film is reduced.

SUMMARY OF THE INVENTION

Therefore, the technical problem to be solved by the present invention is to reduce the possibility that the contact pieces will be a resistance to the film feed or injure the film in the perforation detection device of the contact piece type.

In order to solve the problem as described above, there is provided a perforation detection device for a camera and the like which is provided with a first rolling contact means constructed so that a first contact piece is arranged on either the front surface side or the rear surface side of a film and a second contact piece is arranged on the other side with interposition of the film, and the first contact piece comes in contact with the second contact piece through a perforation in a film feeding stage. The first rolling contact means is constructed of a conductive rolling member which comes in rolling contact with the film surface and is made as a separate member from the first and second contact pieces. The first and second contact pieces are pressing the rolling member. This rolling member is preferably comprised of, for example, a ball.

With the above arrangement, the rolling member is supported by its support member as it is capable of rolling in the film feeding stage, and it comes in rolling contact with either the front surface or the rear surface of the film with the advance of the film. Therefore, the coefficient of friction between the rolling member and the film is small, and accordingly, the rolling member scarcely be a resistance to the advance of the film. Furthermore, since the resistance is small and the film can be fed smoothly as described above, the film surface can be prevented from being injured.

On the other hand, when a perforation advances to the position of the rolling member, the rolling member comes in pressure contact with the second contact piece hrough the perforation. Consequently, a continuity is provided between the contact pieces, and therefore, the event that the perforation has come to a specified position can be detected by the continuity. Furthermore, in the above construction, only the rolling member is used as the detection section in the detection device of the contact piece type, and therefore, the cost increase can be suppressed.

Furthermore, in the above construction, the second contact piece may be provided with a conductive second rolling member which comes in rolling contact with the film surface on the rear surface side of the first contact piece independently of the second contact piece. With this arrangement, both film surfaces are put in rolling contact with the rolling members in the film feeding stage, and this can reduce the possibility that the contact piece will become a resistance to the film feed.

More preferably, a second rolling contact means and a third contact piece which cooperates with the second rolling contact means are further provided. The second rolling contact means includes a third conductive rolling member which is supported by a third support member as it is capable of rolling, and the third rolling member is juxtaposed in a film feed direction with the first rolling member of the first rolling contact means, as arranged at an interval corresponding to a film perforation interval. The third contact piece is arranged on the same side as that of the first contact piece with respect to the film. The third support member supports the third rolling member between the second and third contact pieces so that it comes in rolling contact with either one of the front surface and the rear surface of the film. Thus, when the film is fed, the first rolling member rolls between the film and either one of the first contact piece and the second contact piece, while the third rolling member rolls between the film and either one of the third contact piece and the second contact piece. When the first and third rolling members simultaneously coincide with two perforations of the film fed, the first rolling member comes in contact with both the first and second contact pieces to provide a continuity between both the contact pieces, while the third rolling member comes in contact with both the third and second contact pieces to provide a continuity between both the contact pieces, thereby providing a continuity between the first contact piece and the third contact piece.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 12 is a view similar to FIG. 4 showing a third embodiment of the perforation detection device;

DETAILED DESCRIPTION OF THE PREFERRED EMBODIMENTS

The first embodiment of the perforation detection device for a camera according to the present invention will be described in detail below with reference to FIGS. 1 through 7 and 17.

Figure 1:
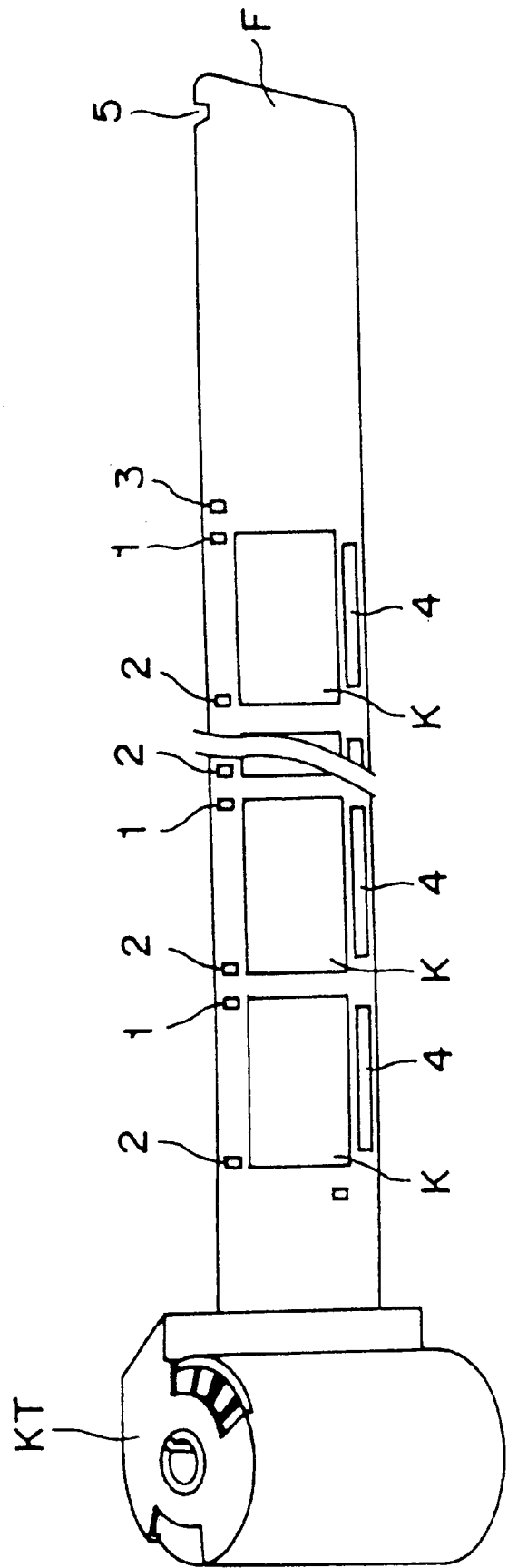
FIG. 1 is a perspective view of a film cartridge for use in a perforation detection device for a camera according to the present invention.

A film cartridge to be used in this camera will be described first with reference to FIG. 1. In FIG. 1 are shown a cartridge KT, a film F and each frame K. One longer side edge of the film F is provided with perforations 1 and 2 located at a fore end position and a hind end position of each frame K. Further, one perforation 3 is formed in a position on the film leading end side ahead of the perforation 1 at the fore end side of the first frame. Below each frame K is formed a magnetic recording area 4 for data recording, so that several pieces of information relevant to a pickup image data can be recorded on it. It is to be noted that a notch 5 is formed at the leading end portion of the longer side edge of the film F on the side of which the perforations 1, 2 and 3 are provided.

Figure 2:
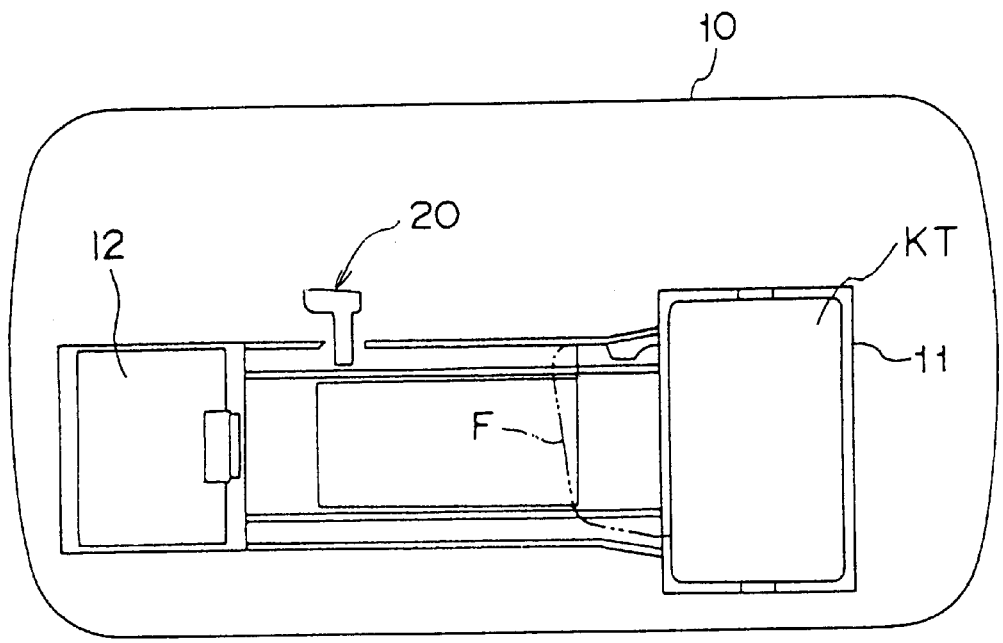
FIG. 2 is a rear view schematically showing the internal construction of the camera.
Figure 3:
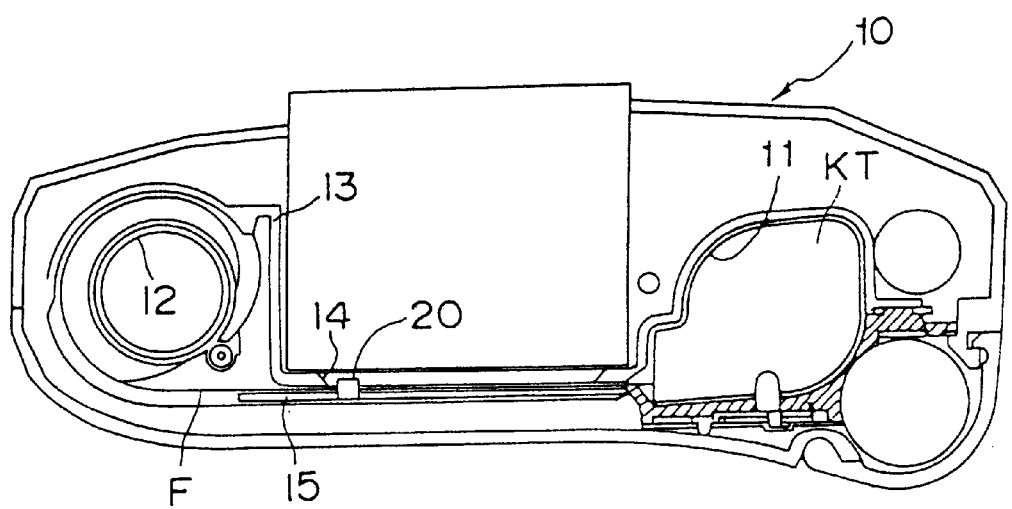
FIG. 3 is a transverse sectional view of a center portion of FIG. 2.

FIG. 2 is a rear view schematically showing the internal construction of a camera 10 provided with the present perforation detection device, while FIG. 3 is a transverse sectional view of a center portion of it. The reference numeral 11 denotes a cartridge chamber for lodging therein the cartridge KT, while a film winding spool 12 for winding the film F is provided on the opposite side of the cartridge chamber 11 with interposition of an exposure position. In a path in which the perforations 1, 2 and 3 pass when winding the film F by the film winding spool 12 is provided a detection device 20 for detecting the perforations 1, 2 and 3. It is to be noted that the reference numeral 13 denotes a body frame, the reference numeral 14 denotes an aperture and the reference numeral 15 denotes a pressure plate.

Figure 4:
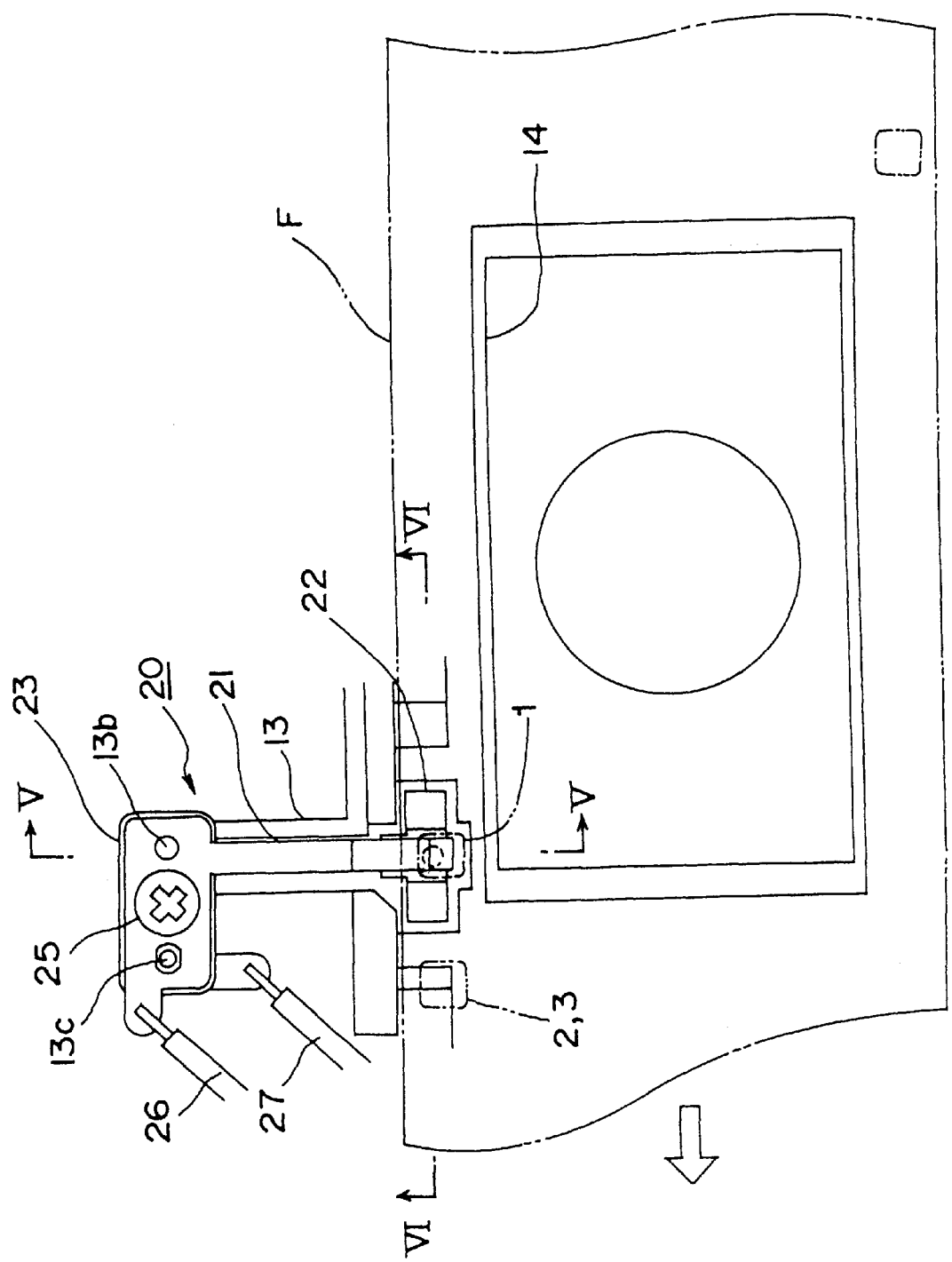
FIG. 4 is a view in which a first embodiment of the perforation detection device is viewed from the rear surface side of the camera with a pressure plate on the rear surface of the film removed.
Figure 5:
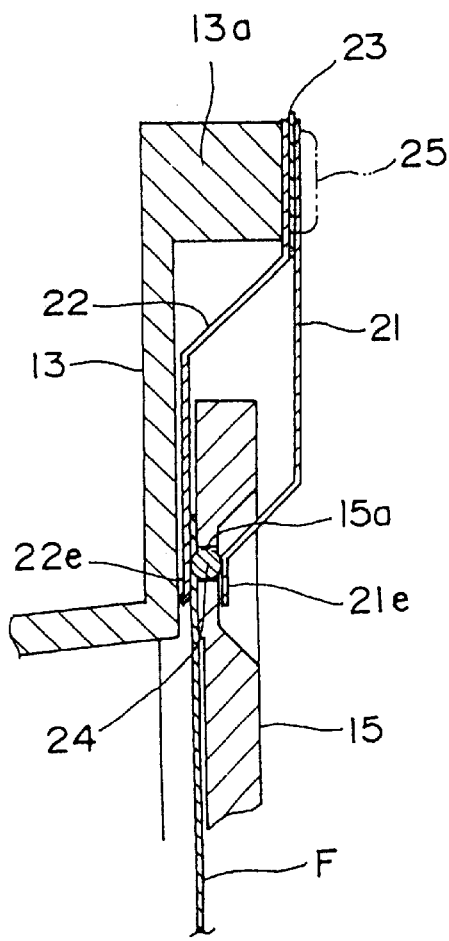
FIG. 5 is a sectional view taken along a line V—V in FIG. 4.
Figure 6:
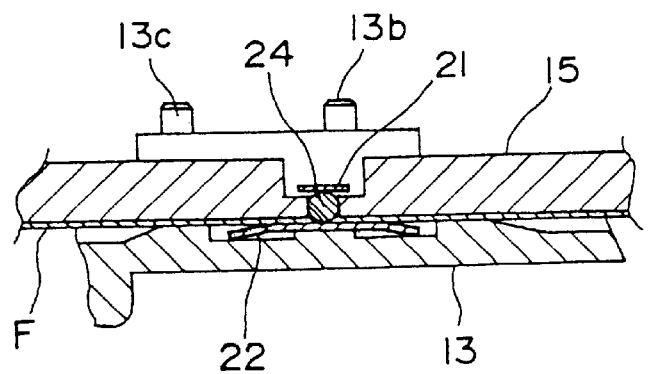
FIG. 6 is a sectional view taken along a line VI—VI in FIG. 4.

This detection device 20 will be described next with reference to FIGS. 4 through 7. FIG. 4 is a view in which this detection device 20 is viewed from the rear surface side of the camera in a state in which the pressure plate 15 on the rear surface side of the film F is removed. FIG. 5 is a sectional view taken along a line V—V in FIG. 4. FIG. 6 is a sectional view taken along a line VI—VI in FIG. 4.

Figure 7A:
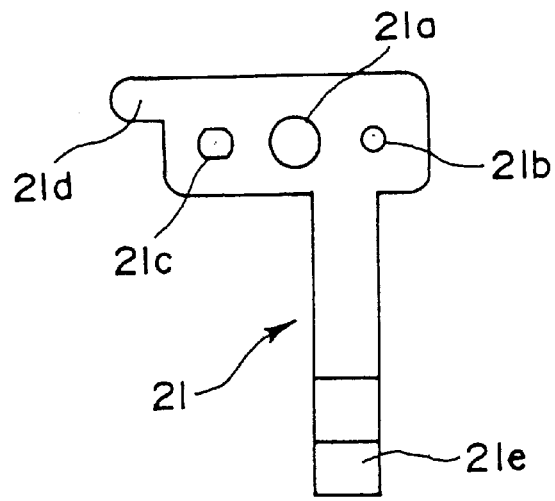
FIG. 7A is a rear view of a first contact piece.
Figure 7B:
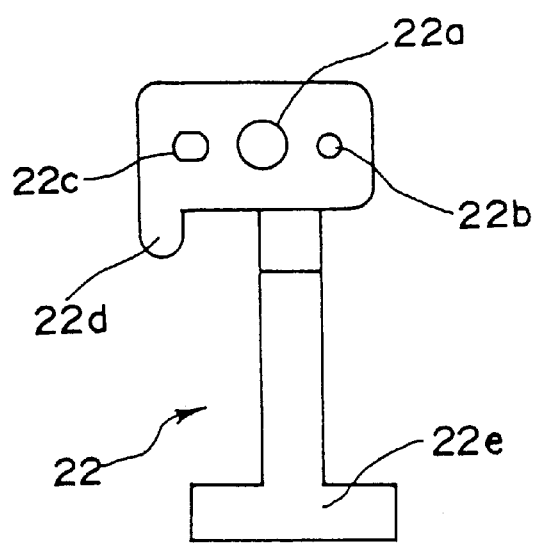
FIG. 7B is a rear view of a second contact piece.
Figure 7C:
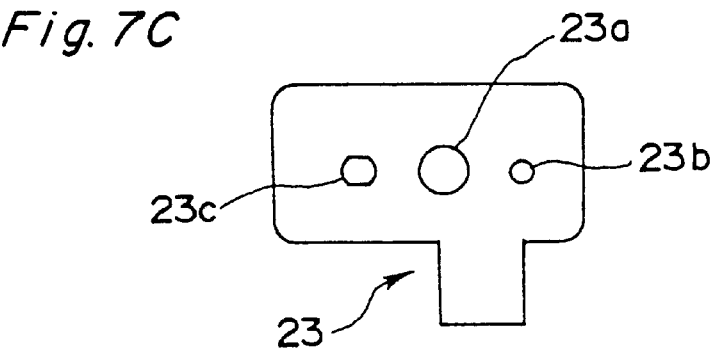
FIG. 7C is a rear view of an insulating piece.

As illustrated, this detection device 20 is comprised of a first contact piece 21, a second contact piece 22, an insulating piece 23 and a metal ball 24 which serves as a rolling member. As shown in FIGS. 7A, 7B and 7C, the first contact piece 21, the second contact piece 22 and the insulating piece 23 have mounting holes 21a, 22a and 23a, respectively. Then, the first contact piece 21 and the second contact piece 22 are fixed to a contact piece mounting section 13a of the body frame 13 with interposition of the insulating piece 23 by means of a screw 25 that is put through the mounting holes 21a, 23a and 22a with the insulating piece 23 interposed between the first contact piece 21 and the second contact piece 22.

On the right-hand side and the left-hand side of the mounting holes 21a, 22a and 23a are formed positioning holes 21b and 21c, 22b and 22c and 23b and 23c, respectively, so that both the contact pieces 21 and 22 and the insulating piece 23 can be positioned by positioning pins 13b and 13c of the body frame 13. It is to be noted that the positioning holes 21c, 22c and 23c on the left-hand side are formed as elongated holes, and accurate positioning is achieved by means of the positioning pin 13b and the positioning holes 21b, 22b and 23b on the right-hand side. Further, protruding portions 21d and 22d of the first contact piece 21 and the second contact piece 22 are connected to lead wires 26 and 27.

The first contact piece 21 and the second contact piece 22 are constructed so that their tip end portions 21e and 22e are positioned with interposition of the film F respectively on the rear surface side and the front surface side of the path in which the perforations 1, 2 and 3 advance in the film feeding stage. The metal ball 24 is retained in a hole 15*a* of the pressure plate 15 as a detection section independent of the main body of the first contact piece 21, and the tip end portion 21*e* of the main body of the first contact piece 21 and the tip end portion 22*e* of the second contact piece 22 are put in pressure contact with it on both sides. In the illustrated state, the metal ball 24 is put in pressure contact with the second contact piece 22 through the perforation 1, and therefore, both the contact pieces 21 and 22 are electrically conducted each other. As shown best in FIG. 6, the tip end portion 22*e* of the second contact piece 22 has both its left-hand and right-hand sides bent in directions in which they are separating apart from the film surface, thereby allowing the film to smoothly advance.

On the other hand, when the film advances and the perforations 1, 2 and 3 pass through the position of the metal ball 24, the film F enters the space between the second contact piece 22 and the metal ball 24. Consequently, the conduction between both the contact pieces 21 and 22 is interrupted. Thus, the metal ball 24 comes in pressure contact with the second contact piece 22 through the perforations 1, 2 and 3 thereby providing a continuity between the contact pieces 21 and 22 only when the perforations 1, 2 and 3 come to the position of the metal ball 24, and therefore, the perforations can be detected by the continuity. Therefore, in the present embodiment, the film can be positioned every frame by stopping the film feed upon counting the perforations 1, 2 and 3 by twos.

According to the above arrangement, the metal ball 24 that is the detection section of the first contact piece 21 comes in rolling contact with the film surface with the advance of the film. F. Accordingly, it has a reduced coefficient of friction with the film F, and therefore, the resistance to the advance of the film can be reduced. Furthermore, since the resistance is small as described above, the film surface can be prevented from being injured. Furthermore, in the above construction, only the rolling member is used as the detection section of the detection device of the contact piece system, and therefore, the cost increase can be suppressed.

Figure 17:
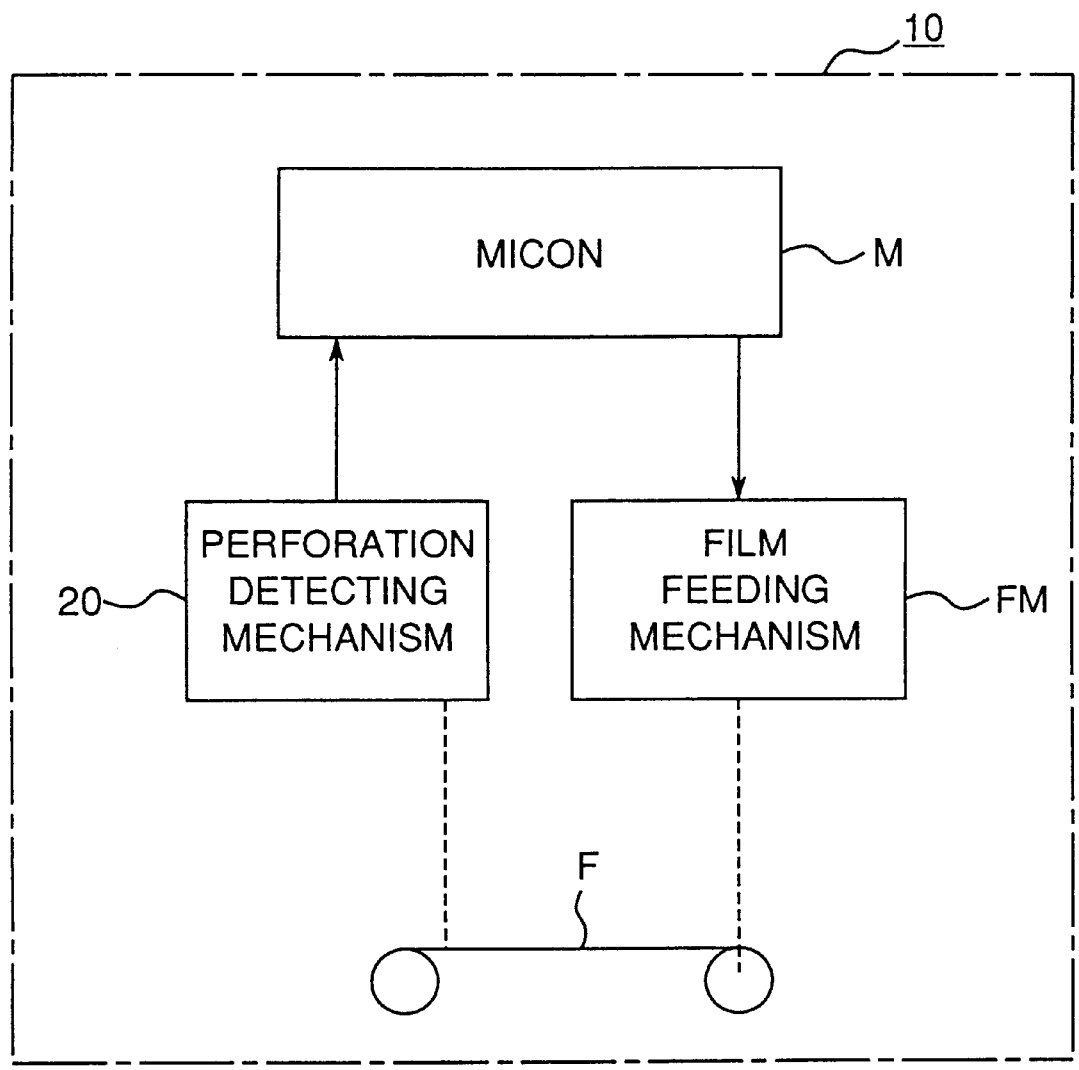
FIG. 17 is a block diagram showing a control system of a film feed mechanism of the first through third embodiments.

Furthermore, as shown in FIG. 17, a detection signal detected by the perforation detection device 20 is inputted to a microcomputer M provided in the main body of the camera, and the microcomputer M controls a film feed mechanism FM according to the input signal.

Figure 8:
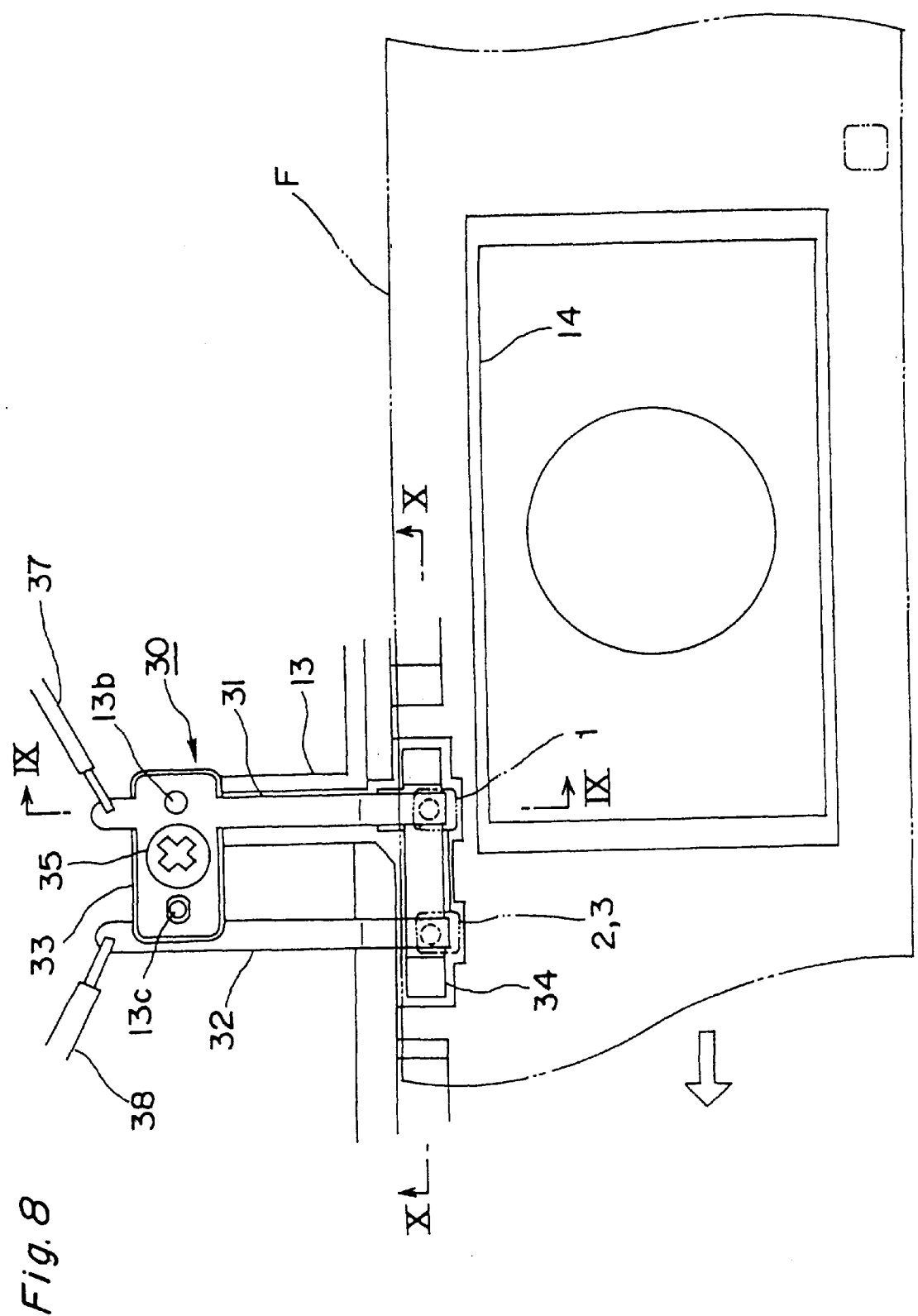
FIG. 8 is a view similar to FIG. 4 showing a second embodiment of the perforation detection device.
Figure 9:
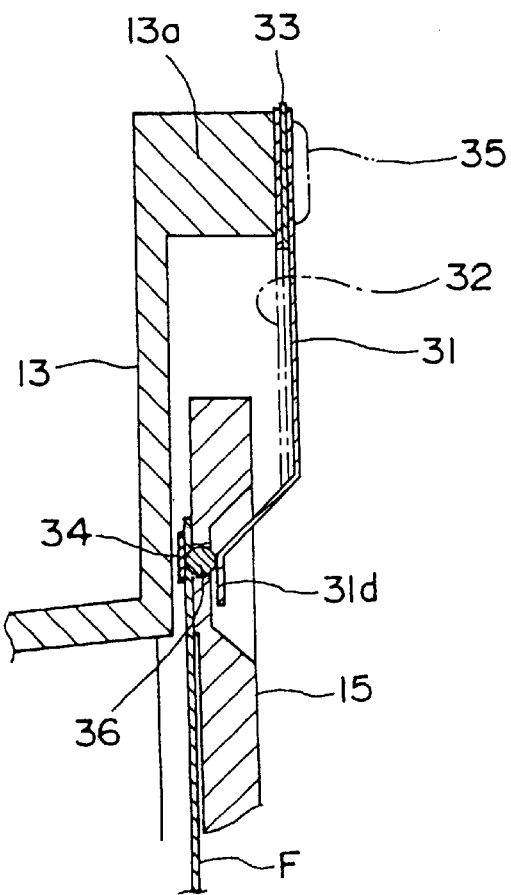
FIG. 9 is a sectional view taken along a line IX—IX in FIG. 8.
Figure 10:
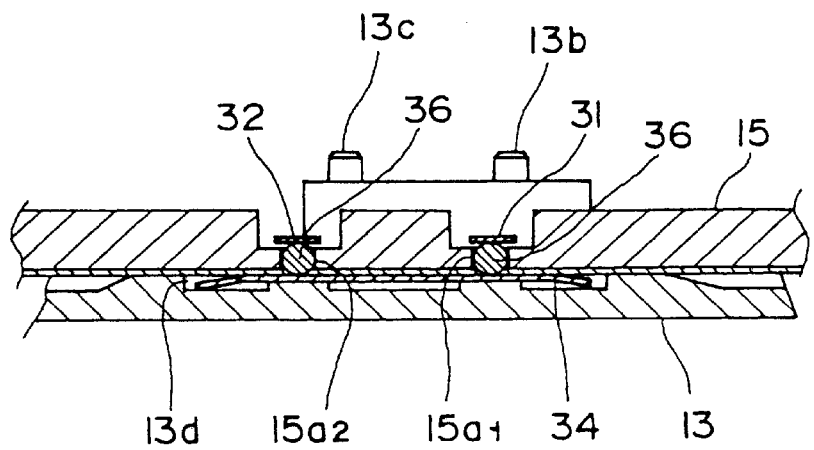
FIG. 10 is a sectional view taken along a line X—X in FIG. 8.

Next, a second embodiment will be described with reference to FIGS. 8 through 11. FIG. 8 is a view of the present detection device 30 viewed from the rear surface side of the camera in a state in which the pressure plate 15 on the rear surface of the film is removed. FIG. 9 is a sectional view taken along a line IX—IX in FIG. 8. FIG. 10 is a sectional view taken along a line X—X in FIG. 8. The present embodiment differs from the first embodiment in the point that two metal balls are used.

Figure 11A:
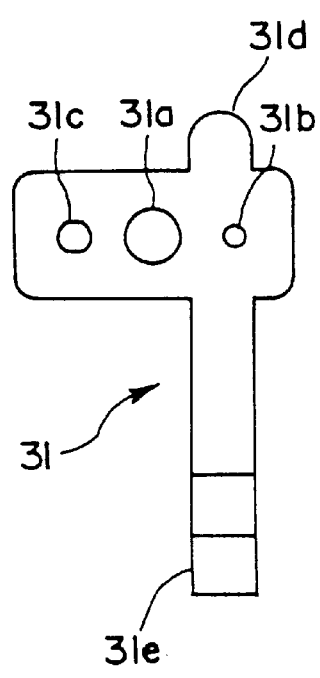
FIGS. 11A and 11B are rear views of two contact piece members constituting a first contact piece.
Figure 11B:
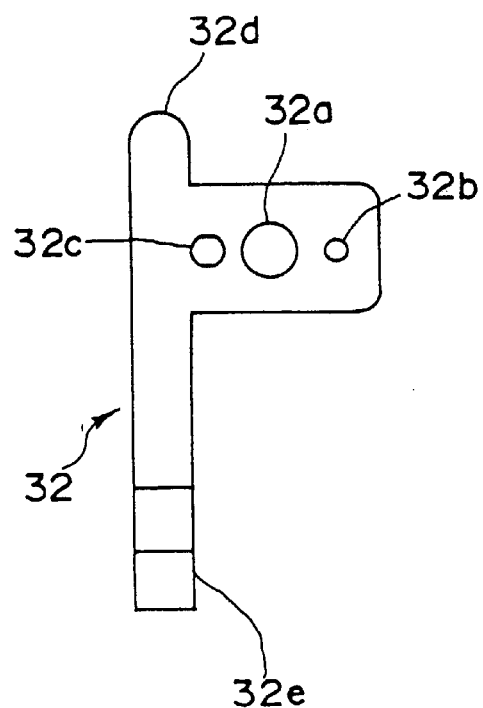
Figure 11C:
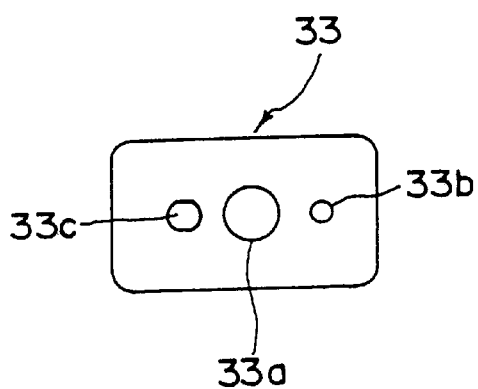
FIG. 11C is a rear view of an insulating piece.

The first contact piece is comprised of two contact piece members 31 and 32 of which rear shapes are shown in FIGS. 11A and 11B. Both the contact piece members 31 and 32 are fixed to the contact piece mounting section 13*a* of the body frame 13 with interposition of an insulating piece 33 shown in FIG. 11C. Both the contact piece members 31 and 32 and the insulating piece 33 have mounting holes 31*a*, 32*a* and 33*a* for fixing them to the contact piece mounting section 13*a* by means of a screw 35, and positioning holes 31*b* and 31*c*, 32*b* and 32*c* and 33*b* and 33*c* for positioning them to the positioning pins 13*b* and 13*c* of the contact piece mounting section 13*a*, respectively. Further, the positioning holes 31*c*, 32*c* and 33*c* on the left-hand side are formed as elongated holes similarly to the first embodiment. Then, protruding portions 31*d* and 32*d* of both the contact piece members 31 and 32 are connected to lead wires 36 and 37.

Figure 11D:
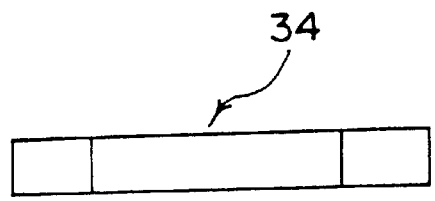
FIG. 11D is a rear view of a second contact piece.

On the other hand, as shown in FIG. 11D, a second contact piece 34 is formed into an elongated rectangular shape, and it is retained in a recess portion 13*d* of the body frame 13 on the front surface side of the film F. Both the left-hand and right-hand sides of the second contact piece 34 are bent in a direction in which they are separating apart from the film surface as shown in FIG. 10, so that it does not hinder the smooth advance of the film. Further, metal balls 36 are retained at two portions 15*a*1 and 15*a*2 of the pressure plate 15, and the tip end portions 31*e* and 32*e* of both the contact piece members 31 and 32 of the first contact piece and the second contact piece 34 are put in pressure contact with them on both sides.

With the above arrangement, the detection circuit is not closed if there is merely satisfied the condition that the perforations have advanced to the position of the contact piece member 31 and the metal ball 36 and the second contact piece 34 are put in contact with each other in the position in the feeding stage of the film F. The detection circuit is closed when the metal ball 36 is put in contact with the second contact piece 34 additionally in the position on the contact piece member 32 side. Therefore, in the present embodiment, the film F can be positioned in the image pickup position by stopping the film feed every time the detection circuit is closed. Therefore, differently from the first embodiment, it is not required to count the perforations.

Even in this construction, the metal balls 36 come in rolling contact with the film surface with the advance of the film F, and therefore, the coefficient of friction between the metal balls 36 and the film F is reduced. The above arrangement can also prevent the metal balls 36 from becoming a resistance to the advance of the film and prevent the film from being injured, also allowing the cost increases to be suppressed.

Figure 13:
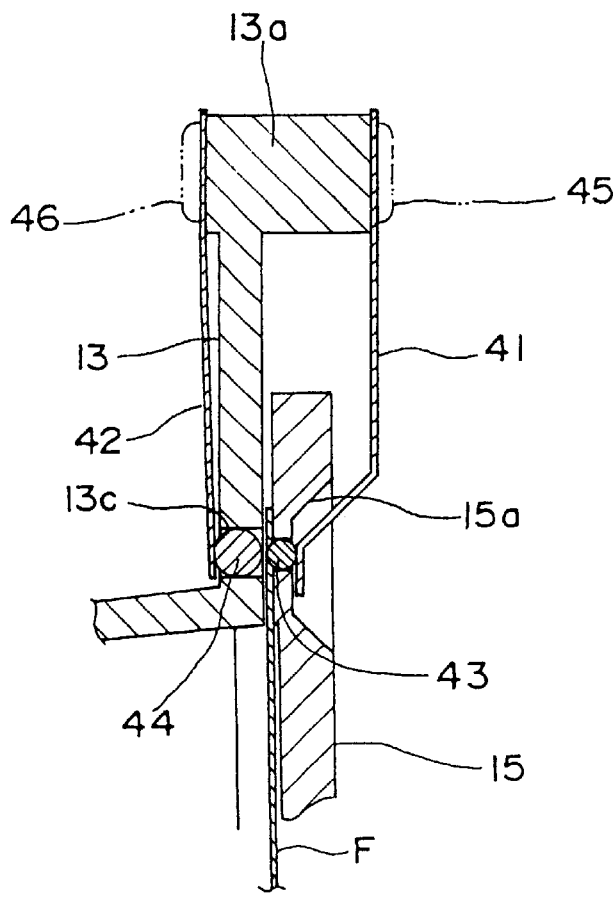
FIG. 13 is a sectional view taken along a line XIII—XIII in FIG. 12.
Figure 14:
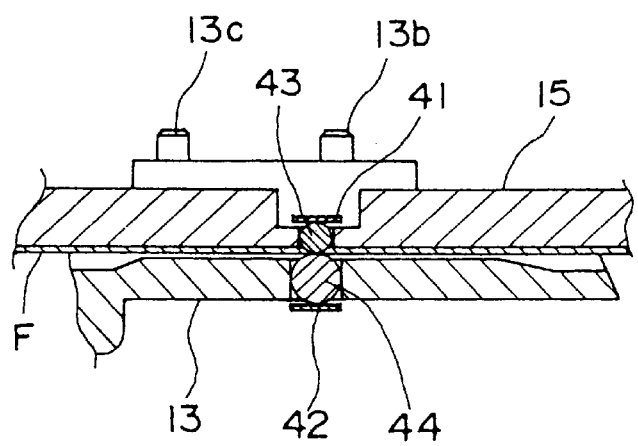
FIG. 14 is a sectional view taken along a line XIV—XIV in FIG. 12.

Next, a third embodiment will be described with reference to FIGS. 12 through 14. FIG. 12 is a view of the present detection device 40 viewed from the rear surface side of the camera in a state in which the pressure plate 15 on the rear surface side of the film is removed. FIG. 13 is a sectional view taken along a line XIII—XIII in FIG. 12. FIG. 14 is a sectional view taken along a line XIV—XIV in FIG. 12. This example differs from the first embodiment in the point that both the first and second contact pieces positioned at the front and the rear with interposition of the film F are each provided with a metal ball.

In FIG. 12, the first contact piece 41 and the second contact piece 42 have approximately the same shapes as those of the first contact piece 21 and the second contact piece 22 of the first embodiment. Further, the first contact piece 41 has approximately the same sectional shape as that of the first contact piece 21 of the first embodiment, where it is fixed by a screw 45 from the rear surface side (the right-hand side in FIG. 13) with respect to the contact piece mounting section 13*a* of the body frame 13, and it is put in pressure contact with a metal ball 43 retained in the hole 15*a* of the pressure plate 15 similarly to the first embodiment.

The second contact piece 42 is fixed to the contact piece mounting section 13*a* of the body frame 13 from the front surface side (the left-hand side in FIG. 13). The body frame 13 is provided with a hole 13*e* that is formed in a position in which it overlaps the pressure plate 15*a*, and a second contact piece 42 is put in pressure contact from the front surface side with a metal ball 44 retained in the hole 13e. It is to be noted that both the first contact piece 41 and the second contact piece 42 are positioned to the body frame 13 with the same positioning structure as that of the first embodiment, and they are connected to lead wires 47 and 48, respectively.

Also with the above arrangement, a continuity is provided between the contact pieces 41 and 42 as a consequence of a contact of both the metal balls 43 and 44 in the perforations 1, 2 and 3 only when the perforations 1, 2 and 3 have advanced to the positions of the metal balls 43 and 44. Since the perforations can be detected by the continuity, by stopping the film feed when the perforations 1, 2 and 3 are counted by twos, the film can be positioned every frame. Furthermore, with the above arrangement, both the surfaces of the film F come in rolling contact with the metal balls 43 and 44. Therefore, the resistance of the film can be further reduced than in each of the aforementioned embodiments, and the possibility of the injury of the film surface can be further reduced.

Figure 15:
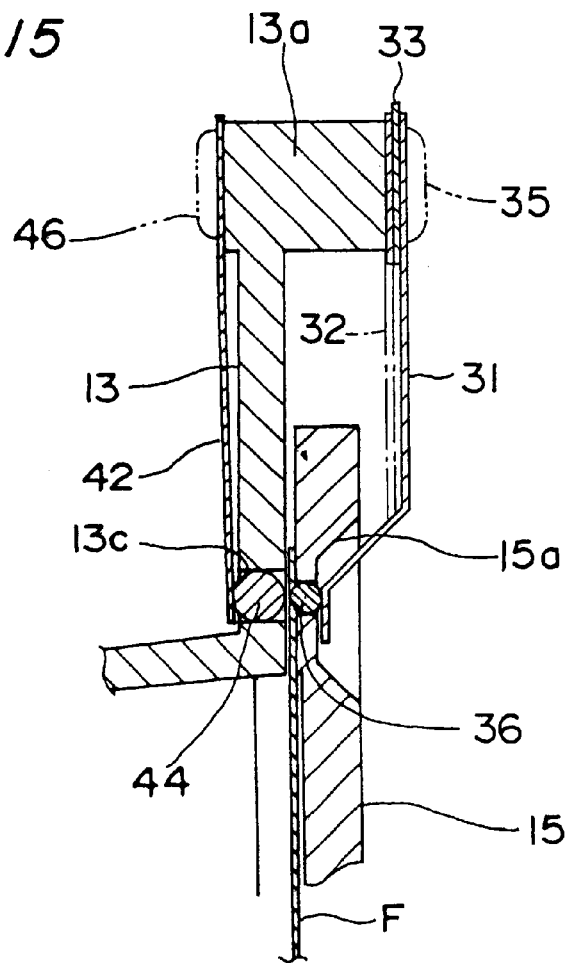
FIG. 15 is a sectional view similar to FIG. 13 showing the second and third embodiments of the perforation detection device.
Figure 16:
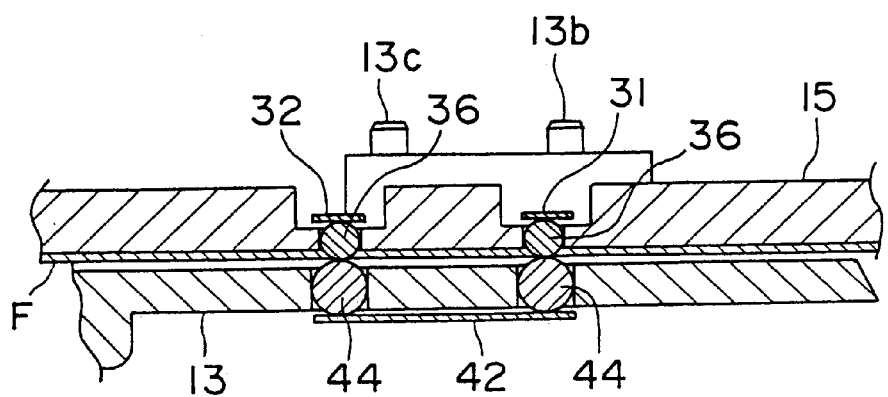
FIG. 16 is a sectional view similar to FIG. 14 showing a modification example of FIG. 15.

It is to be noted that the present invention is not limited to the above-described construction, but various modifications can be made. For example, as shown in FIGS. 15 and 16, it is acceptable to provide in the second embodiment a metal ball on the front surface side of the film as in the third embodiment. With this arrangement, no counting of the perforations is required, and the film feed can be performed smoothly to the same degree as that of the third embodiment. Furthermore, the aforementioned embodiments are each applied to a camera which uses the film of the new standard according to which two perforations are formed per frame. However, it can be easily applied to a camera which uses the conventional 35-mm film or a camera according to a film standard having a different perforation arrangement proposed in future.

What is claimed is:

1. A perforation detection device for detecting perforations provided at specified portions of a film as said film is fed, comprising:
    a first contact piece arranged on a first surface side of the film;
    a second contact piece arranged on a second surface side of the film, which is opposite to said first surface side, in a position opposite from the first contact piece;
    a first rolling contact means including a first rolling member which is conductive; and
    a first support member which is disposed between said first and second contact pieces to support the first rolling member between the first and second contact pieces so that said first rolling member comes into rolling contact with the first surface of the film, whereby die first rolling member rolls between the film and the first contact piece when the film is fed, and comes into contact with both the first and second contact pieces when said first rolling member coincides in position with a perforation of the film as the film is fed to thereby provide an electrical contact between said first and second contact pieces which is used to detect said perforation.

2. A perforation detection device as claimed in claim 1, wherein
    said rolling member is a ball.

3. A perforation detection device as claimed in claim 1, wherein
    said first and second contact pieces are put in pressure contact with said rolling member.

4. A perforation detection device as claimed in claim 1, wherein
    said rolling member is positioned between the film and the first contact piece and rolls in contact with a surface of the film when the film is fed.

5. A perforation detection device as claimed in claim 4, wherein said first contact piece is positioned on a rear surface side of said film.

6. A perforation detection device as claimed in claim 1, wherein
    said first rolling contact means is further provided with a second conductive rolling member which is adjacent to said first rolling member and is supported by a second support member,
    said first and second support members support the first and second rolling members, respectively, between said first and second contact pieces so that said first and second rolling members come into rolling contact with the first surface and the second surface of the film, respectively, whereby
    both the rolling members roll between the film and the first and second contact pieces, respectively, when the film is fed, and the first and second rolling members come in contact with each other when the first and second rolling members coincide in position with the perforations of the film as the film is fed, thereby providing electrical connectivity between the first and second contact pieces.

7. A perforation detection device as claimed in claim 6, wherein said first and second rolling members comprise first and second balls, respectively, wherein the balls come into contact with each other when a perforation passes between the balls.

8. A perforation detection device as claimed in claim 7, wherein said first support member comprises a first plate, and said first ball is retained in a hole in said first plate, and wherein said second support member comprises a second plate, and said second ball is retained in a hole in said second plate.

9. A perforation detection device as claimed in claim 1, further comprising:
    a second rolling contact means having a second conductive rolling member, the second rolling member being juxtaposed in a direction in which the film is fed with said first rolling member of said first rolling contact means and arranged at a predetermined interval from said first rolling contact means,
    a third contact piece which is arranged on said first side of said film so as to engage the second rolling contact means, and
    a second support member for supporting the second rolling member between said second and third contact pieces so that said second rolling member comes in rolling contact with said first surface of the film, whereby when the film is fed, the first rolling member rolls between the film and the first contact piece, while the second rolling member rolls between the film and the third contact piece, and when the first and second rolling members simultaneously coincide with two perforations of the film as the film is fed, the first rolling member comes into contact with both the first and second contact pieces to provide electrical connectivity between both the first and second contact pieces, while the second rolling member comes into contact with both the third and second contact pieces to provide electrical connectivity between both the third and second contact pieces, thereby providing electrical connectivity between the first contact piece and the third contact piece.

10. A perforation detection device as claimed in claim 9, wherein said first and second rolling members comprise first and second balls, respectively.

11. A perforation detection device as claimed in claim 10, wherein said first support member comprises a first section of a plate, and said first ball is retained in a hole in said first section of said plate, and wherein said second support member comprises a second section of said plate, and said second ball is retained in a hole in said second section of said plate.

12. A perforation detection device as claimed in claim 1, wherein said first support member comprises a plate, and said ball is retained in a hole in said plate between said first and second contact pieces.

13. A perforation detection device as claimed in claim 1, wherein said first and second contact pieces are secured at first respective ends thereof to a contact piece mounting section.

14. A perforation detection device as claimed in claim 13, wherein said first and second contact pieces include respective tip end portions which are placed into pressure contact with said ball.

15. A perforation detection device as claimed in claim 13, wherein said first and second contact pieces are secured by said contact piece mounting section such that an insulating piece is interposed between said first and second contact pieces.

16. An apparatus provided with a perforation detection device for detecting perforations provided at specified portions of a film as said film is fed, the detection device of said apparatus comprising:

a device for feeding said film;

a first contact piece arranged on a first surface side of the film;

a second piece arranged on a second surface side of the film, wherein said second side is opposite to said first side, and wherein said second contact piece is arranged in a position opposite from the first contact piece;

a first rolling contact means including a first rolling member which is conductive;

a first support member which is disposed between said first and second contact pieces to support said first rolling member between the first and second contact pieces so that said first rolling member comes into rolling contact with said first surface of the film, the first rolling member rolling between the film and the first and contact piece when the film is fed, and coming into contact with both the first and second contact pieces when the first rolling member coincides in position with a perforation of the film as the film is fed; and said apparatus further including a controller which receives an electric signal from the first or second contact piece via an electrical connection connecting said controller to said first or second contact piece, and which controls at least said device for feeding said film according to the electric signal.

17. An apparatus as claimed in claim 16, wherein said rolling member is a ball.

18. An apparatus as claimed in claim 16, wherein said first and second contact pieces are put in pressure contact with said rolling member.

19. An apparatus as claimed in claim 16, wherein said rolling member is positioned between the film and the first contact piece and rolls in contact with a rear surface of the film when the film is fed.

20. An apparatus as claimed in claim 19, wherein said first contact piece is positioned on the rear surface side of said film.

21. An apparatus as claimed in claim 16, wherein said first rolling contact means is further provided with a second conductive rolling member which is adjacent to said first rolling member and is supported by a second support means, said first and second support members support the first and second rolling members, respectively, between said first and second contact pieces so that said first and second rolling members come in rolling contact with the first surface and the second surface of the film, respectively, whereby both the rolling members roll between the film and the first and second contact pieces, respectively, when the film is fed, and the first and second rolling members come into contact with each other when the first and second rolling members coincide in position with the perforations, of the film fed, thereby providing electrical connectivity between the first and second contact pieces.

22. An apparatus as claimed in claim 21, wherein said apparatus is a camera.

23. An apparatus as claimed in claim 16, wherein said perforation detection device further comprises:

a second rolling contact means having a second conductive rolling member, the second rolling member being juxtaposed in a direction in which the film is fed with said first rolling member of said first rolling contact means and arranged at a predetermined interval from said first rolling member, a third contact piece which is arranged on the first side of the film so as to engage with the second rolling contact means, and a second support member for supporting the second rolling member between said second and third contact pieces so that said second rolling member comes into rolling contact with the first surface of the film, whereby when the film is fed, the first rolling member rolls between the film and the first contact piece, while the second rolling member rolls between the film and the third contact piece, and when the first and second rolling members simultaneously coincide with two perforations of the film as the film is fed, the first rolling member comes into contact with both the first and second contact pieces to provide electrical connectivity between the first and second contact pieces, while the second rolling member comes into contact with both the third and second contact pieces to provide electrical connectivity between the third and second contact pieces, thereby providing electrical connectivity between the first contact piece and the third contact piece.

24. An apparatus as claimed in claim 23, wherein said apparatus is a camera.

25. An apparatus as claimed in claim 16, wherein said apparatus is a camera.

26. An apparatus in which is used a film having perforations at specified portions thereof, comprising:

a device for feeding said film;

a perforation detection device which is arranged in a position to detect perforations which pass by said detection device as said film is fed and includes a first rolling member that is in rolling contact with a surface of the film, wherein said perforation detection device produces an electric signal in response to said rolling member encountering a perforation, and a controller which is electrically connected to said perforation detection device and which receives the electric signal from the perforation detection device, and which controls at least the device for feeding film according to the electric signal;

wherein said first rolling member is a ball.

27. An apparatus as claimed in claim 26, wherein said first rolling member is conductive.

28. An apparatus as claimed in claim 26, further comprising;

a second rolling member, said first and second rolling members being arranged at both sides of said film, respectively, confronting with each other.

29. An apparatus as claimed in claim 26, further comprising:

a second rolling member juxtaposed in a film feed direction with said first rolling member.

30. A camera provided with a perforation detection device for detecting perforations provided at specified portions of film in a direction in which the film is fed, the detection device comprising:

a first contact piece arranged on a first surface side of the film as the film is fed;

a second contact piece arranged on an opposite second surface side of the film at a position opposite from the first contact piece;

a first rolling contact means including a first rolling member which is conductive; and a first support member which is disposed between said first and second contact pieces to support the first rolling member between the first and second contact pieces so that said first rolling member comes into rolling contact with the first surface of the film, whereby the first rolling member rolls between the film and the first contact piece when the film is fed, and comes into contact with both the first and second contact pieces when said first rolling member coincides in position with a perforation of the film as the film is fed to thereby produce an electric signal used by said detection device to detect said perforation.

31. A camera as claimed in claim 30, wherein said support member is a pressure plate of the camera.

\* \* \* \* \*

UNITED STATES PATENT AND TRADEMARK OFFICE
CERTIFICATE OF CORRECTION

PATENT NO. : 5,923,912
DATED : July 13, 1999
INVENTOR(S) : N. Miki, et al.

It is certified that error appears in the above-identified patent and that said Letters Patent is hereby corrected as shown below:

Title page,
Item [73] Assignee: Sinpo Optical Co., Ltd., Taiwan, Republic of China Signed and Sealed this Ninth Day of October, 2001

Attest:

NICHOLAS P. GODICI
Attesting Officer
Acting Director of the United States Patent and Trademark Office